May 5, 1925.
H. BENVIE
1,537,001
SAFETY VALVE FOR GAS JETS AND THE LIKE
Filed Jan. 6, 1922
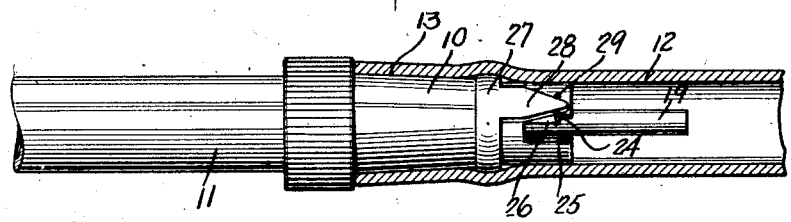
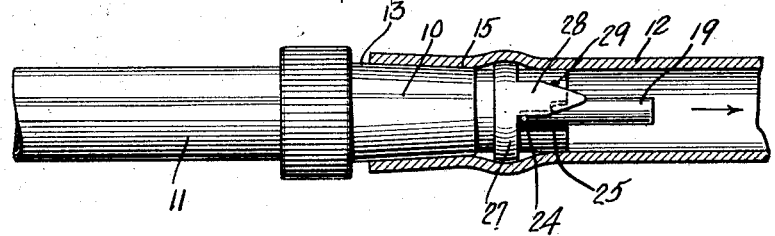
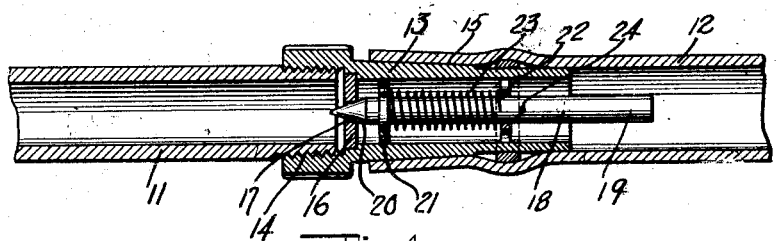
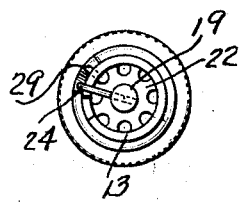
WITNESSES
INVENTOR
HERBERT BENVIE
BY
ATTORNEYS Patented May 5, 1925.

1,537,001

UNITED STATES PATENT OFFICE.

HERBERT BENVIE, OF MERIDEN, CONNECTICUT, ASSIGNOR OF ONE-HALF TO RUSSELL H. WHITE, OF MERIDEN, CONNECTICUT.

SAFETY VALVE FOR GAS JETS AND THE LIKE.

Application filed January 6, 1922. Serial No. 527,526.

*To all whom it may concern:*

Be it known that I, HERBERT BENVIE, a citizen of the United States, and a resident of Meriden, in the county of New Haven and State of Connecticut, have invented new and useful Improvements in Safety Valves for Gas Jets and the like, of which the following is a full, clear, and exact description.

This invention relates to improvements in safety devices for use with gas jets or the like.

In the use of portable gas stoves the hose, which is provided to connect the same to the gas jets, has always been a source of danger since in moving the stove when the gas is turned on there is a possibility of severing the connection between the hose and gas jet. When such an undesirable accident occurs there is always a considerable escape of gas which may lead to damage to life and property.

The general object of this invention is the provision of a safety device for use in conjunction with the gas jet and hose which serves to automatically shut off the supply of gas upon a strain of sufficient strength being exerted upon the hose to sever it from the gas jet.

This object is accomplished by providing a tube for interposing between the gas jet and hose which has mounted therein a spring-controlled valve that is normally held in an open position and providing a means engaged by the hose and co-operating with the valve to release the same upon a pull of sufficient strength being exerted on the hose.

This and other objects of the invention will be more clearly understood from the following detailed description and accompanying drawings.

Figure 1 is a side elevation of the safety device showing the valve in its normal position;

Figure 2 is a side elevation of the safety device showing the position of the valve after it has been released from the means provided for holding it in an opened position;

Figure 3 is a cross section through the safety device;

Figure 4 is an end view showing the perforated plate used in which the valve is slidably mounted.

Referring to the above-mentioned drawings, the safety device assemblage 10 is shown mounted on a gas jet 11 and having a hose 12 attached thereto. The safety device assemblage 10 consists of a tube 13, one end of which is provided with an internal thread 14 for engaging the gas jet 11, and the tapered end 15 for engaging the hose 12. A valve seat 16 is fixed in the tube 13 and has an opening 17 extending therethrough. Located in the tube 13 at a distance from the valve seat 16 is a perforated plate 22. Slidably and rotatably mounted in the plate 22 in alinement with the opening 17 is a shaft 19 which is part of the valve assemblage 18. Mounted on the shaft 19 is a perforated piston 21 movable in the tube 13. This perforated piston guides the longitudinal movement of the shaft. Interposed between the perforated plate 22 and the piston 21 is a spring 23 for projecting the shaft endwise to carry the conical head 20 into position in the opening 17 to close the latter.

A pin 24 is attached to the valve shaft 19 and is movable in a longitudinal slot 25 cut in the wall of the tube 13. A shoulder 26 is formed in the wall of the tube 13 on one side of the slot 25. Slidably mounted on the outside of the tube 13 is a collar 27. Integral with this collar 27 is a projection 28, the end of which is of triangular shape. A pin 29 is fixed to the wall of the tube 13 and extends radially outward and is in circumferential alinement with the shoulder 26.

The operation of this device is as follows:

The safety attachment is mounted on the gas jet as shown in Figures 1, 2 and 3. The collar 27 is then forced to the left, as shown at Figure 1, the valve 18 drawn outward and the pin 24 positioned on the shoulder 26, with the triangular pointer 28 located between the pins 24 and 29. The tube 12 is then projected over the tapered end 15 of the tube 13 into the position shown in Figure 1. If in the moving of a stove or the like a strain is exerted on the hose sufficient to move it on the tapered end 15 of the tube the collar 27 is drawn outward to the position shown in Figure 2. This forces the triangular-shaped pointer 28 between the pins 24 and 29 and releases the pin 24 from the shoulder 26. Upon the release of the pin 24 from the shoulder the spring 23, which was compressed by the drawing outward of the valve, forces the conically shaped end of the valve into position in the opening in the valve seat and thus shuts off the supply of gas.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

Claims:

1. A safety valve comprising a casing having a passage therethrough, one end of the casing being constructed for receiving a hose, a valve seat mounted in the casing, a spring-controlled plunger movably mounted in the casing normally coacting with the valve seat to close the casing passage, means carried by the plunger for engaging the casing to retain the plunger in an inactive position, and means movably mounted on the casing capable of operation by the movement of the hose for releasing the plunger.

2. A safety valve comprising a tube having one end threaded for mounting on a gas jet and the other end tapered to engage a hose, a valve seat fixed in the tube, a spring-controlled valve slidably mounted in the tube and co-operating with the valve seat, a pin extending through the valve shaft and movable in a longitudinal slot cut in the tube wall to engage a shoulder in the tube wall at one side of the slot to retain the valve in an opened position, a collar slidably mounted on the tube and engaging the rubber hose, and a projection in conjunction with the collar for releasing said pin from said shoulder operated by a pull on the hose.

3. As a new article of manufacture, a device of the class described, comprising a tube having means in conjunction with one end for attaching it to a gas jet, and means in conjunction with the other end for engaging a hose, a valve seat fixed in said tube, a valve co-operating with said valve seat, a spring for holding said valve in position in the valve seat, a pin attached to the valve shaft and movable in a longitudinal slot cut in the tube wall, means in conjunction with the tube wall for engaging the pin to retain the valve in open position, a collar slidable on the tube and engaged by the hose, and a triangular shaped projection integral with the collar and co-operating with the pin to release it from the said retaining means.

HERBERT BENVIE.